US009315094B2

United States Patent
Hazebayashi et al.

(10) Patent No.: US 9,315,094 B2
(45) Date of Patent: Apr. 19, 2016

(54) WORKING VEHICLE (71) Applicant: TADANO LTD., Takamatsu-shi, Kagawa (JP)

(72) Inventors: Mikio Hazebayashi, Takamatsu (JP); Kimihiko Terata, Sanuki (JP)

(73) Assignee: TADANO LTD., Takamatsu-shi (JP)

( * ) Notice: Subject to any disclaimer, the term of this patent is extended or adjusted under 35 U.S.C. 154(b) by 0 days.

(21) Appl. No.: 14/406,329

(22) PCT Filed: May 16, 2013

(86) PCT No.: PCT/JP2013/063712
§ 371 (c)(1),
(2) Date: Dec. 8, 2014

(87) PCT Pub. No.: WO2014/002639
PCT Pub. Date: Jan. 3, 2014

(65) Prior Publication Data
US 2015/0129330 A1    May 14, 2015

(30) Foreign Application Priority Data

Jun. 29, 2012    (JP) ................. 2012-147880

(51) Int. Cl.
*B60K 6/48*    (2007.10)
*B60K 6/22*    (2007.10)
(Continued)

(52) U.S. Cl.
CPC ... *B60K 6/22* (2013.01); *B60K 6/48* (2013.01); *B60K 6/54* (2013.01); *B60K 25/06* (2013.01); *B60L 11/12* (2013.01); *B60L 11/14* (2013.01); *B60L 11/1816* (2013.01); *B60R 16/03* (2013.01); *B60W 10/06* (2013.01); *B60W 10/08* (2013.01); *B60W 10/30* (2013.01); *B60W 20/00* (2013.01); *B66C 9/14* (2013.01); *B66C 13/12* (2013.01);
(Continued)

(58) Field of Classification Search
CPC ........ B60K 6/48; B60W 20/00; B60W 20/10; B60W 10/06; B60W 10/08; B60W 10/30; Y02T 10/6221
See application file for complete search history.

(56) References Cited

U.S. PATENT DOCUMENTS 7,932,633 B2    4/2011    King et al.
8,653,696 B2    2/2014    King et al.
(Continued)

FOREIGN PATENT DOCUMENTS

JP    A-2000-226183    8/2000
JP    A-2002-166736    6/2002
(Continued)

OTHER PUBLICATIONS

International Search Report issued in International Patent Application No. PCT/JP2013/063712 dated Aug. 13, 2013.

*Primary Examiner* — Faye M Fleming
(74) *Attorney, Agent, or Firm* — Oliff PLC (57) ABSTRACT

There is provided a working vehicle that can continuously drive a working machine by electric power to improve the silence. The hydraulic pump is driven by the power of the motor generator that is driven by the electric power of an external power supply supplied via the power cable. By this means, when a crane operation is performed by the crane apparatus in a workplace with an external power supply, it is possible to continuously drive the hydraulic pump by the power of the motor generator, and therefore to continuously perform the crane operation of the crane apparatus, improving the silence.

4 Claims, 6 Drawing Sheets (51) Int. Cl.

| | | |
|---|---|---|
| *B60W 10/08* | (2006.01) | |
| *B60W 10/30* | (2006.01) | |
| *B60W 20/00* | (2006.01) | |
| *B66C 23/40* | (2006.01) | |
| *B60L 11/14* | (2006.01) | |
| *B60L 11/18* | (2006.01) | |
| *B60W 10/06* | (2006.01) | |
| *B60K 6/54* | (2007.10) | |
| *B60K 25/06* | (2006.01) | |
| *B60L 11/12* | (2006.01) | |
| *B66C 13/12* | (2006.01) | |
| *B66C 13/14* | (2006.01) | |
| *B60R 16/03* | (2006.01) | |
| *B66C 9/14* | (2006.01) | |
| *B66C 23/36* | (2006.01) | |
| *B66C 23/62* | (2006.01) | |

(52) U.S. Cl.
CPC ............... *B66C 13/14* (2013.01); *B66C 23/36* (2013.01); *B66C 23/40* (2013.01); *B66C 23/62* (2013.01); *B60L 2200/40* (2013.01); *B60W 2300/12* (2013.01); *B60Y 2200/416* (2013.01); *B60Y 2400/214* (2013.01); *Y02T 10/6221* (2013.01); *Y02T 10/6286* (2013.01); *Y02T 10/70* (2013.01); *Y02T 10/7005* (2013.01); *Y02T 10/7072* (2013.01); *Y02T 10/7077* (2013.01); *Y02T 90/14* (2013.01); *Y10S 903/903* (2013.01)

(56) References Cited

U.S. PATENT DOCUMENTS

| | | | |
|---|---|---|---|
| 2008/0152517 A1* | 6/2008 | Ishii | A01D 69/02 417/423.5 |
| 2009/0095549 A1* | 4/2009 | Dalum | B60K 6/12 180/65.265 |
| 2010/0096926 A1 | 4/2010 | King et al. | |
| 2011/0169449 A1 | 7/2011 | King et al. | |
| 2014/0145677 A1 | 5/2014 | King et al. | |
| 2015/0090506 A1* | 4/2015 | Hirozawa | B60K 6/387 180/53.8 |

FOREIGN PATENT DOCUMENTS

| | | |
|---|---|---|
| JP | A-2006-136120 | 5/2006 |
| JP | A-2008-231762 | 10/2008 |
| JP | A-2010-104227 | 5/2010 |
| JP | A-2011-20515 | 2/2011 |
| JP | A-2011-93474 | 5/2011 |

* cited by examiner

| MODE | ACTIVITY | Eng | Bat | Plug |
|---|---|---|---|---|
| SUPER LOW NOISE MODE | PERFORM OPERATION BY ELECTRIC POWER FROM EXTERNAL POWER SUPPLY | | | 3 |
| | ASSIST EXTERNAL POWER SUPPLY BY ENGINE | 2 | | 3 |
| | ASSIST EXTERNAL POWER SUPPLY BY IN-VEHICLE BATTERY | | 1 | 2 |
| LOW NOISE MODE | PERFORM OPERATION BY ENGINE DRIVEN AT PREDETERMINED SPEED | 2 | | |
| | ASSIST ENGINE DRIVEN AT PREDETERMINED SPEED BY IN-VEHICLE BATTERY | 2 | 1 | |
| | ASSIST ENGINE DRIVEN AT PREDETERMINED SPEED BY EXTERNAL POWER SUPPLY | 2 | | 3 |
| MIDDLE LEVEL NOISE MODE | PERFORM OPERATION BY ENGINE | 5 | | |
| | ASSIST ENGINE BY EXTERNAL POWER SUPPLY | 2 | | 3 |
| | ASSIST ENGINE BY IN-VEHICLE BATTERY | 4 | 1 | |
| HYBRID TRAVELING MODE | MOVE VEHICLE BY ENGINE | 10 | | |
| | ASSIST ACCELERATION AND CLIMBING BY IN-VEHICLE BATTERY | 10 | 2 | |
| | TAKE ELECTRIC POWER BY MOTOR GENERATOR | | −2 | |

NOTE: NUMBERS SHOW EXAMPLES OF POWER RATIO

*FIG.6*

WORKING VEHICLE

TECHNICAL FIELD

The present invention relates to a working vehicle equipped with a working apparatus driven by the power of one of or both an engine and an electric motor.

BACKGROUND ART

Conventionally, there has been known a working vehicle including: an engine; an electric generator that generates electricity by the power of the engine; a battery that accumulates the electric power generated by the electric generator; an electric motor that is driven by the electric power accumulated in the battery; and a hydraulic pump that drive a working apparatus by the power of one of or both the engine and the electric motor (see, for example, Patent Literature 1).

With the above-described working vehicle, the hydraulic pump is driven by the power of the electric motor that is driven by the electric power of the battery to improve the silence while the working apparatus is operated.

CITATION LIST

Patent Literature

PTL1: Japanese Patent Application Laid-Open No. 2000-226183

SUMMARY OF INVENTION

Technical Problem

However, the above-described working apparatus cannot be equipped with a battery with a sufficient capacity due to the limitation of the space for the battery in the vehicle body. Thus, when the hydraulic pump is driven by the power of the electric motor, the battery capacity will run out for a short time, and therefore, in order to continue the operation, the engine has to be started to drive the hydraulic pump by the power of the engine. Consequently, it is not possible to maintain the silence.

It is therefore an object of the present invention to provide a working vehicle that can improve the silence by enabling the working apparatus to be continuously driven by the electric power.

Solution to Problem

To achieve the above-described object, the working vehicle according to the present invention includes: a mobile vehicle body; a working apparatus provided in the vehicle body and configured to perform a predetermined operation; an engine configured to be able to output power used to move the mobile vehicle body and to drive the working apparatus; an electric motor configured to be able to output power used to move the mobile vehicle body and to drive the working apparatus; a hydraulic pump configured to generate a hydraulic pressure to drive the working apparatus by one of or both the power of the engine and the power of the electric motor; an external electric power supply device configured to supply electric power of an external power supply to the electric motor; a hydraulic pump drive unit configured to drive the hydraulic pump by the power of the electric motor that is driven by the electric power supplied from the external electric power supply device; a battery configured to be able to supply the electric power to the electric motor; and a battery power adding device configured to add the electric power of the battery to the electric motor while the hydraulic pump is driven by the hydraulic pump drive unit.

By this means, the electric power of the external power supply can be supplied to the electric motor, and therefore, when the working apparatus is operated in a workplace with an external power supply, it is possible to continuously drive the hydraulic pump by the power of the electric motor.

Effect of the Invention

According to the present invention, when the working apparatus is operated in a workplace with an external power supply, it is possible to continuously drive the hydraulic pump by the power of the electric motor, and therefore to continue the operation of the working apparatus, improving the silence.

DESCRIPTION OF EMBODIMENTS

FIGS. 1 to 6 show one embodiment of the present invention.

Figure 1:
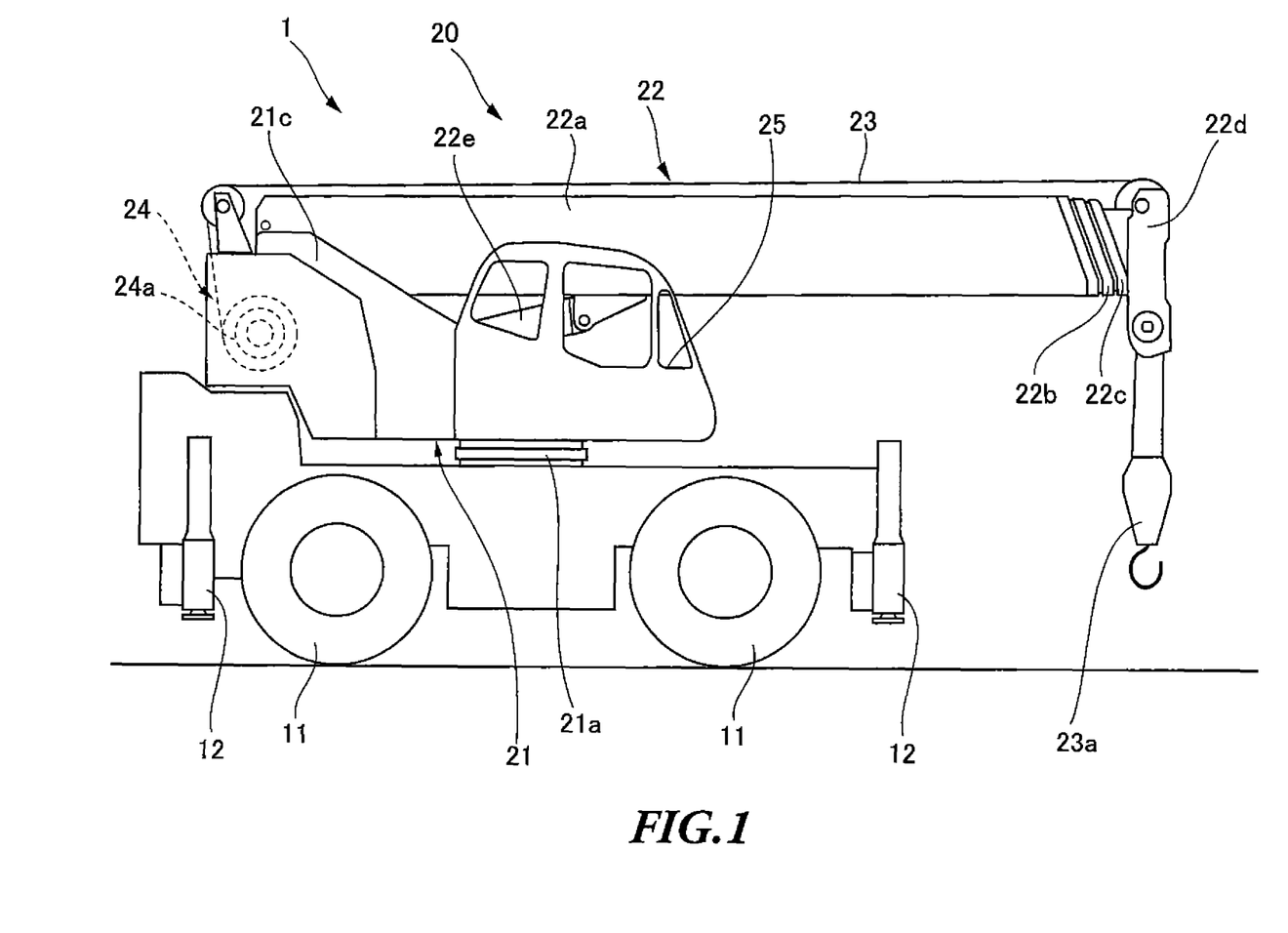
FIG. 1 is a side view showing a mobile crane according to one embodiment of the present invention.

As shown in FIG. 1, a mobile crane 1 as the working vehicle according to the present invention includes a vehicle 10 to move, and a crane apparatus 20.

The vehicle 10 has wheels 11, and is moved by a power source, which is one of or both an engine 41 and a motor generator 41b. In addition, outriggers 12 are provided in the front part and back part of the vehicle 10 on both the left and right sides to prevent the vehicle 10 from falling down and to stably support the vehicle 10 during a crane operation. Each of the outriggers 12 can move outward in the width direction and can be extended downward by a hydraulic jack cylinder 13 shown in FIG. 2. Each of the outriggers 12 contacts the ground at its bottom end, and therefore can support the vehicle 10 on the ground in a stable manner.

The crane apparatus 20 includes: a swivel base 21 provided at an approximately center of the vehicle 10 in the front-to-back direction of the vehicle 10 and configured to be able to swivel on the horizontal plane; a boom 22 configured to be able to rise and lower with respect to the swivel base 21 and to extend and retract; a wire rope 23 suspended from the front end of the boom 22; a winch 24 configured to wind up or off the wire rope 23; and a cabin 25 provided in front of the swivel base 21, where the control for crane operations is performed.

The swivel base 21 is configured to be able to swivel with respect to the vehicle 10 by means of a ball bearing or roller bearing swivel support 21a. The swivel base 21 is driven to swivel by a hydraulic swivel motor 21b shown in FIG. 2.

Figure 2:
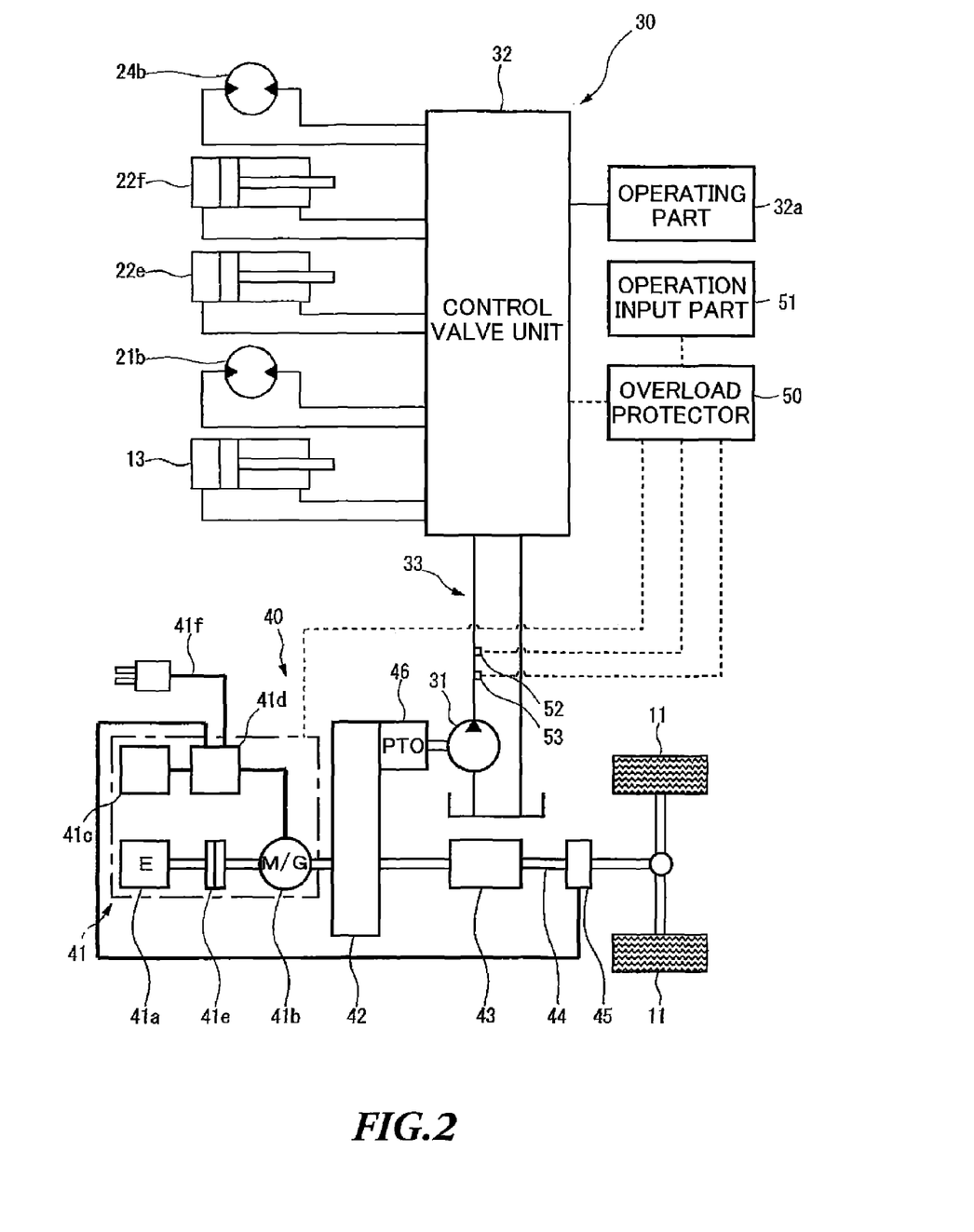
FIG. 2 is a schematic view showing the power system and the control system of the mobile crane.

The boom 22 is constituted by a plurality of boom members 22a, 22b, 22c and 22d, and is formed as a telescopic boom in such a manner that the base boom 22a, the second boom 22b, and the third boom 22c can accommodate the second boom 22b, the third boom 22c, and the fourth boom 22d which are adjacent and anterior to the base boom 22a, the second boom 22b, and the third boom 22c, respectively. The base end of the base boom member 22a is swingably connected to a bracket 21c of the swivel base 21. A hydraulic boom cylinder 22e is connected between the boom member 22a and the bracket 21c to raise and lower the boom 22 by extending and retracting the boom cylinder 22e. In addition, a hydraulic telescopic cylinder 22f shown in FIG. 2 is provided in the base boom member 22a. The boom 22 is extended and retracted by extending and retracting the telescopic cylinder 22f.

A hook block 23a is provided on the front end of the wire rope 23 and hangs from the front end side of the boom 22. Goods can be hooked by the hook block 23a, and then suspended from the front end of the boom 22.

The winch 24 has a drum 24a around which the wire rope 23 is wound, which can rotate in forward and reverse directions by a hydraulic winch motor 24b shown in FIG. 2.

The cabin 25 is provided lateral to the bracket 21c on the swivel base 21 and swivels with the swivel base 21.

Actuators, such as the jack cylinder 13, the swivel motor 21b, the boom cylinder 22e, the telescopic cylinder 22f and the winch motor 24b, are activated by the supply or discharge of hydraulic oil. The hydraulic oil to activate each actuator is supplied by a hydraulic supply device 30 shown in FIG. 2.

As shown in FIG. 2, the hydraulic supply device 30 includes: a hydraulic pump 31 configured to generate a hydraulic pressure; a control valve unit 32 configured to control the flow of the hydraulic oil discharged from the hydraulic pump 31; and a hydraulic oil circuit 33 configured to actuate each actuator by supplying the hydraulic oil discharged from the hydraulic pump 31 via the control valve unit 32.

As shown in FIG. 2, the hydraulic pump 31 is driven by the power taken from a power unit 40 configured to supply the power to move the vehicle 10 and to drive the crane apparatus 20.

The control valve unit 32 includes a plurality of control valves corresponding to the respective actuators. Each of the control valves is operated by an operating part 32a such as an operating lever and an operating pedal. Each of the control valves changes the flow passage of the hydraulic oil according to the direction in which the operating part 32a is operated, and can regulate the flow rate of the hydraulic oil based on the amount of the operation of the operating part 32a. In addition, each of the control valves has a switching means such as a solenoid, and can be operated according to a signal from an overload protector described later.

The power unit 40 includes: a power source unit 41 configured to generate power; a torque converter 42, as a drive mechanism, which is configured to amplify the torque of the power outputted from the power source unit 41 and to transmit the torque to the wheels 11 side; a transmission 43, as a drive mechanism, which is configured to change the rotating speed and the torque of the power outputted from the torque converter 42; and an electric retarder 45 provided in a propeller shaft 44 as a drive mechanism and configured to transmit the power outputted from the transmission 43 to the wheels 11.

The power source unit 41 includes: an engine 41a that is a power source mainly for moving the vehicle; a motor generator 41b that functions as an electric motor by the supplied electric power, and also functions as an electric generator when the engine 41a is driven, or when the vehicle reduces the running speed; a battery 41c that accumulates the electric power generated by the motor generator 41b and can supply the electric power when the motor generator 41b functions as an electric motor;

a motor generator drive controller 41d that controls the output of the battery 41c and also controls the action of the motor generator 41b; and a clutch 41e that can switch between the connection and the disconnection of the output shaft of the engine 41a and the input/output shaft of the motor generator 41b.

The motor generator 41b is provided between the engine 41a and the torque converter 42. The power of the engine 41a is transmitted to the torque converter 42 via the input/output shaft of the motor generator 41b by connecting the output shaft of the engine 41a to the input/output shaft of the motor generator 41b by the clutch 41e. The output of the motor generator 41b as an electric motor is a rated output smaller than the output of the engine 41a. The maximum output of the motor generator 41b is about 30% of that of the engine 41a.

The motor generator drive controller 41d includes an inverter, a boost converter, a motor controller, a generator controller and so forth. The motor generator drive controller 41d controls the output of the battery 41c to supply the electric power to the motor generator 41b, and switches the function of the motor generator 41b between the electric generator and the electric motor according to a signal from the overload protector described later. In addition, the motor generator drive controller 41b includes a power cable 41f which can be connected to an eternal power supply. When the motor generator 41b functions as an electric motor, the motor generator drive controller 41d can change the power supply of the motor generator 41b to the battery 41c or the external power supply.

The torque convertor 42 includes a pump impeller provided on the input shaft, a turbine liner provided on the output shaft, and a stator fixed between the pump impeller and the turbine liner. The torque of the power inputted to the input shaft of the torque converter 42 is amplified through the oil, and the outputted from the output shaft. A PTO (power take-off) mechanism 46 that can take the power transmitted to the transmission 43 is provided in the output side of the torque converter 42. The hydraulic pump 31 can be connected to the output side of the torque converter 42 via the PTO mechanism 46. PTO mechanism 46 has not necessarily to be provided in the output side of the torque converter 42 as long as the PTO mechanism 46 can switch between the connection and the disconnection of the output shaft of the engine 41a and the hydraulic pump 31, and between the connection and the disconnection of the input/output shaft of the motor generator 41b and the hydraulic pump 31.

In addition, the mobile crane 1 includes an overload protector 50. The overload protector 50 is provided to prevent the mobile crane 1 from being placed in a so-called overload state in which a load acting on the front end of the boom 22 exceeds a rated load according to the working conditions including the width of the outriggers 12 in the lateral direction, the swivel angle of the swivel base 21, the boom angle of the boom 22, and the length of the extending or retracting boom 22.

The overload protector 50 has a controller constituted by a CPU, a ROM, a RAM and so forth. When the controller receives an input signal from the devices connected to its input side, the CPU reads a program stored in the ROM based on the input signal, stores the state detected by the input signal in the RAM, and transmits an output signal to the devices connected to its output side.

The following components are connected to the overload protector 50: the control valve unit 32; the power source unit 41; an operation input part 51 configured to be operated by the user to input various setting regarding the crane operation; a flow rate detector 52 configured to detect the flow rate of the hydraulic oil discharged from the hydraulic pump 31; and a pressure detector 53 configured to detect the pressure of the hydraulic pump 31 in the discharge side. The overload protector 50 receives a signal regarding the speed of the engine 41a, a signal regarding the amount of the hydraulic oil discharged from the hydraulic pump 31, and a signal regarding the pressure of the hydraulic pump 31 in the discharge side. In addition, the overload protector 50 outputs a control signal to control the action of the motor generator 41b, based on the inputted signals, regarding the speed of the engine 41a, regarding the amount of the hydraulic oil discharged from the hydraulic pump 31, and regarding the pressure of the hydraulic pump 31 in the discharge side.

With the mobile crane 1 as a working machine having the above-described configuration, during a moving mode to move the vehicle 10, mainly the power of the engine 41a, which is 0% to 100% of the maximum output, is transmitted to the propeller shaft 44. In addition, when the vehicle 10 needs a large output to increase the speed or go up a slope while moving, the motor generator 41b is driven. By this means, the power (20% of the maximum output of the engine 41a) of the motor generator 41b is transmitted to the propeller shaft 44 as an assist power, or the motor generator 41b is driven by the propeller shaft 44 to generate electric power. In this case, the PTO mechanism 46 releases the connection between the output shaft of the engine 41a and the hydraulic pump 31 and also between the input/output shaft of the motor generator 41b and the hydraulic pump 31. In addition, the engine 41a is started by the power of the motor generator 41b. Meanwhile, when the vehicle 10 needs to reduce the running speed while moving, electric power is generated in the retarder 45, and the generated power is charged into the battery 41c.

During the crane operation of the crane apparatus 20, the drive mode of the hydraulic pump 31 can be selected by operating the operation input part 51 of the overload protector 50, among a super low noise mode, a low noise mode and a middle level noise mode in order from the lowest noise.

<Super Low Noise Mode>

In the super low noise mode, the power cable 41f is connected to the external power supply to drive the motor generator 41b mainly by the electric power of the external power supply, and the hydraulic pump 31 is driven by the power of the motor generator 41b, which is 30% of the maximum output of the engine 41a. In the super low noise mode, the transmission 43 is in the neutral state; the clutch 41e releases the connection between the engine 41a and the motor generator 41b; and the PTO mechanism 46 releases the connection between the hydraulic pump 31 and the output shaft of the engine 41a and the connection between the hydraulic pump 31 and the input/output shaft of the motor generator 41b. Therefore, it is possible to stop the engine 41a. In the super low noise mode, the crane operation that is required to be done with the lowest noise can be performed only by the power of the motor generator 41b.

In the super low noise mode, when the amount of the power supplied from the external power supply is not sufficient, for example, when the voltage of the external power supply is reduced, the controller of the overload protector 50 supplies the electric power from the battery 41c to the motor generator 41b. Meanwhile, when the torque transmitted to the hydraulic pump 31 is not sufficient, the controller of the overload protector 50 performs a power control process to add the power of the engine 41a, which is 20% of the maximum output, to the hydraulic pump 31. In this case, in order to prioritize the work efficiency over the super low noise which is realized only by the power of the motor generator 41b, the engine 41a is driven. However, the speed of the engine 41a corresponds to the idling engine speed, and therefore it is possible to maintain the low noise state. In this case, it is possible to cover the output range of the crane operation up to the maximum output. The activities of the controller of the overload protector 50 in this case will be described with reference to the flowchart of FIG. 3.

(Step S1)

Figure 3:
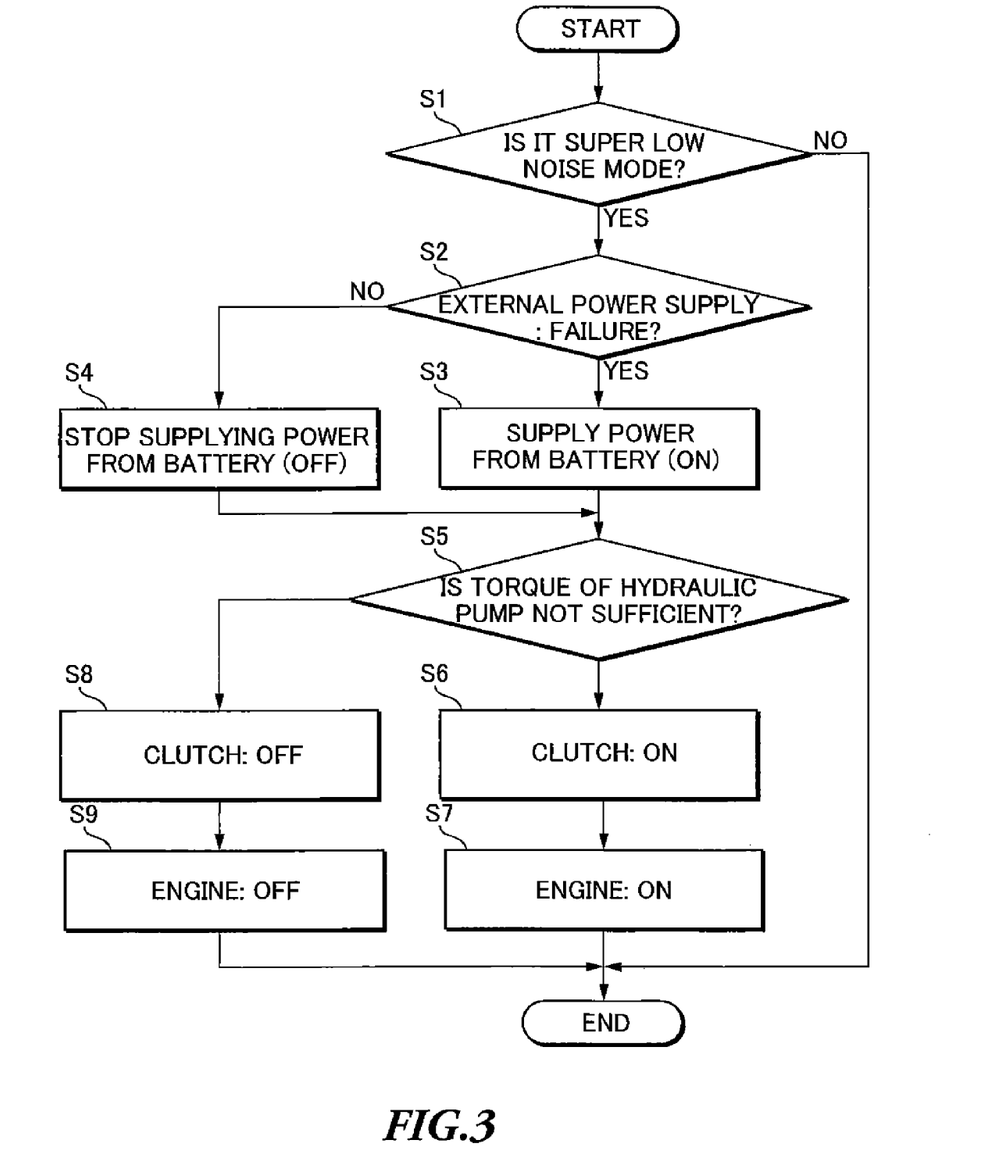
FIG. 3 is a flowchart showing a power control process in a super low noise mode.

In step S1, the CPU determines whether or not the selected operation mode is the super low noise mode. When determining that the selected operation mode is the super low noise mode, the CPU moves the step to step S2. On the other hand, when determining that the selected operation mode is not the super low noise mode, the CPU ends the power control process.

(Step S2)

Having determined that the selected operation mode is the super low noise mode in the step S1, the CPU determines whether or not the amount of the electric power supplied from the external power supply is not sufficient in the step S2. When determining that the amount of the electric power supplied from the external power supply is not sufficient, the CPU moves the step to step S3. On the other hand, when determining that the amount of the electric power supplied from the external power supply is sufficient, the CPU moves the step to step S4.

(Step S3)

Having determined that the amount of the electric power supplied from the external power supply is not sufficient in the step S2, the CPU supplies the electric power from the battery 41c to the motor generator 41b (ON) in the step S3, and moves the step to step S5. At this time, the electric power inputted to the motor generator 41b includes the electric power supplied from the external power supply, which is 20% of the maximum output of the engine 41a, and the electric power supplied from the battery 41c, which is 10% the maximum output of the engine 41a.

(Step S4)

Having determined that the electric power supplied from the external power supply is sufficient in the step S2, the CPU stops supplying the electric power to the battery 41c in the step S4 (OFF), and moves the step to the step S5.

(Step S5)

In the step S5, the CPU determines whether or not the torque transmitted to the hydraulic pump 31 is not sufficient to perform the crane operation. When determining that the torque transmitted to the hydraulic pump 31 is not sufficient, the CPU moves the step to step S6. On the other hand, when determining that the torque transmitted to the hydraulic pump 31 is sufficient, the CPU moves the step to step S8. Here, the determination of whether or not the torque transmitted to the hydraulic pump 31 is not sufficient to perform the crane operation is made by acquiring the torque of the hydraulic pump 31 required to perform the crane operation and the torque transmitted from the motor generator 41b to the hydraulic pump 31, and comparing them with one another. The torque of the hydraulic pump 31 required to perform the crane operation is calculated based on the flow rate detected by the flow rate detector 52 and the pressure detected by the pressure detector 53. Here, the flow rate detected by the flow rate detector 52 and the pressure detected by the pressure detector 53 are constantly monitored. For example, when the load is increased during the crane operation, the pressure at which the variable capacity hydraulic pump 31 discharges the hydraulic oil is increased but the flow rate at which the hydraulic pump 31 discharges the hydraulic oil is reduced. On the other hand, the load is reduced during the crane operation, the pressure at which the hydraulic pump 31 discharges the hydraulic oil is reduced but the flow rate at which the hydraulic pump 31 discharges the hydraulic oil is increased. The torque of the hydraulic pump 31 required to perform the crane operation is calculated based on the relationship between the discharge flow rate and the discharge pressure. Moreover, the torque transmitted from the motor generator 41b to the hydraulic pump 31 can be acquired by constantly monitoring the current value of the motor generator 41b.

(Step S6)

Having determined that the torque transmitted to the hydraulic pump 31 is not sufficient in the step S5, the CPU allows the clutch 41e to connect between the engine 41a and the motor generator 41b (ON) in the step S6, and moves the step to step S7.

(Step S7)

In the step S7, the CPU starts the engine 41a and ends the power control process. At this time, the engine 41a is driven by the power which is 20% of the maximum output.

(Step S8)

Having determined that the torque transmitted to the hydraulic pump 31 is sufficient in the step S5, the CPU allows the clutch 41e to release the connection between the engine 41a and the motor generator 41b (OFF) in step 8, and moves the step to step S9.

(Step S9)

In the step S9, the CPU stops the engine 41a, and ends the power control process.

<Low Noise Mode>

In the low noise mode, the hydraulic pump 31 is driven by the power of the engine 41a at a predetermined engine speed, such as the idling engine speed, which is 20% of the maximum output of the engine 41a. In the low noise mode, the transmission 43 is in the neutral state; the clutch 41e connects between the engine 41a and the motor generator 41b; and the PTO mechanism 46 connects between the hydraulic pump 31 and the torque converter 42.

In the low noise mode, when the torque transmitted to the hydraulic pump 31 is not sufficient, the controller of the overload protector 50 performs the power control process to drive the motor generator 41b by the electric power from the external power supply or the battery 41c and to add the power of the motor generator 41b to the hydraulic pump 31. Here, when the motor generator 41b is driven by the electric power from the external power supply, the electric power is 30% of the maximum output of the engine 41a. On the other hand, when the motor generator 41b is driven by the electric power from the battery 51c, the electric power is 10% of the maximum output of the engine 41a. The activities of the controller of the overload protector 50 in this case will be described with reference to the flowchart of FIG. 4.

(Step S11)

Figure 4:
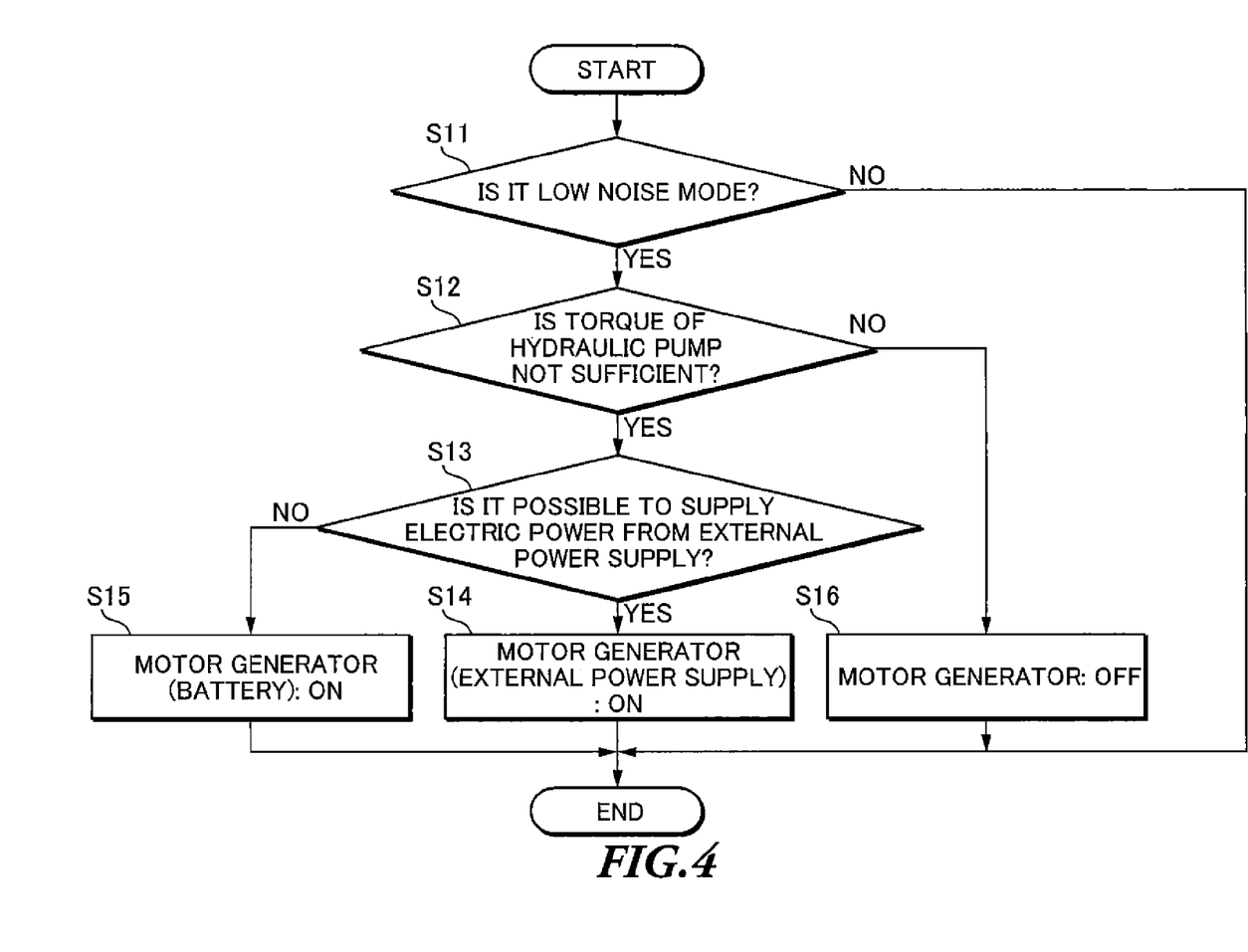
FIG. 4 is a flowchart showing a power control process in a low noise mode.

In step S11, the CPU determines whether or not the selected operation mode is the low noise mode. When determining that the selected operation mode is the low noise mode, the CPU moves the step to step S12. On the other hand, when determining that the selected operation mode is not the low noise mode, the CPU ends the power control process.

(Step S12)

Having determined that the selected operation mode is the low noise mode in the step S11, the CPU determines whether or not the torque transmitted to the hydraulic pump 31 is not sufficient to perform the crane operation in the step S12. When determining that the torque transmitted to the hydraulic pump 31 is not sufficient, the CPU moves the step to step S13.

On the other hand, when determining that the torque transmitted to the hydraulic pump 31 is sufficient, the CPU moves the step to step S16. Here, the determination of whether or not the torque transmitted to the hydraulic pump 31 is not sufficient to perform the crane operation is made by acquiring the torque of the hydraulic pump 31 required to perform the crane operation and the torque transmitted from the engine 41a to the hydraulic pump 31, and comparing them with one another. The torque of the hydraulic pump 31 required to perform the crane operation is calculated in the same way as in the step S5 regarding the super low noise mode. In addition, the torque transmitted from the engine 41a to the hydraulic pump 31 is calculated based on the relationship between the speed of the engine 41a and the torque. Here, the speed of the engine 41a is constantly monitored. Moreover, by constantly monitoring the amount of the fuel injected from the engine 41a, as well as the speed of the engine 41a, it is possible to acquire a more accurate torque transmitted from the engine 41a to the hydraulic pump 31.

(Step S13)

Having determined that the torque transmitted to the hydraulic pump 31 is not sufficient in the step S12, the CPU determines whether or not the electric power of the external power supply can be supplied in the step S13. When determining that the electric power of the external power supply can be supplied, the CPU moves the step to step S14. On the other hand, when determining that the electric power of the external power supply cannot be supplied, the CPU moves the step to step S15.

(Step S14)

Having determined that the electric power of the external power supply can be supplied in the step S13, the CPU drives the motor generator 41b by the electric power of the external power supply in the step S14, and ends the power control process.

(Step S15)

Having determined that the electric power of the external power supply cannot be supplied in the step S13, the CPU drives the motor generator 41b by the electric power of the battery 41c in the step S15, and ends the power control process.

(Step S16)

Having determined that the torque transmitted to the hydraulic pump 31 is sufficient in the step S12, the CPU stops the motor generator 41b in step S16, and ends the power control process.

<Middle Level Noise Mode>

In the middle level noise mode, the hydraulic pump 31 is driven by the power of the engine 41a driven at any speed, for example, when the user operates the accelerator. In the middle level noise mode, the transmission 43 is in the neutral state; the clutch 41e connects between the engine 41a and the motor generator 41b; the connection between the hydraulic pump 31 and the output shaft of the engine 41a; and the PTO mechanism 46 releases the connection between the hydraulic pump 31 and the output shaft of the engine 41a and the connection between the hydraulic pump 31 and the input/output shaft of the motor generator 41b. In the middle level noise mode, the engine 41 is driven by the power within the range of 0% to 50% of the maximum output. The middle level noise mode is to reduce the noise by adding the power of the motor generator 41b to the hydraulic pump 31 as assist power while the engine 41a is driven.

In the middle level noise mode, when the torque transmitted to the hydraulic pump 31 is not sufficient, the controller of the overload protector 50 performs the power control process to drive the motor generator 41b by the electric power of the external power supply or the battery 41*c* and to add the power of the motor generator 41*b* to the hydraulic pump 31. The activities of the controller of the overload protector 50 in this case will be described with reference to the flowchart of FIG. 5.

(Step S21)

Figure 5:
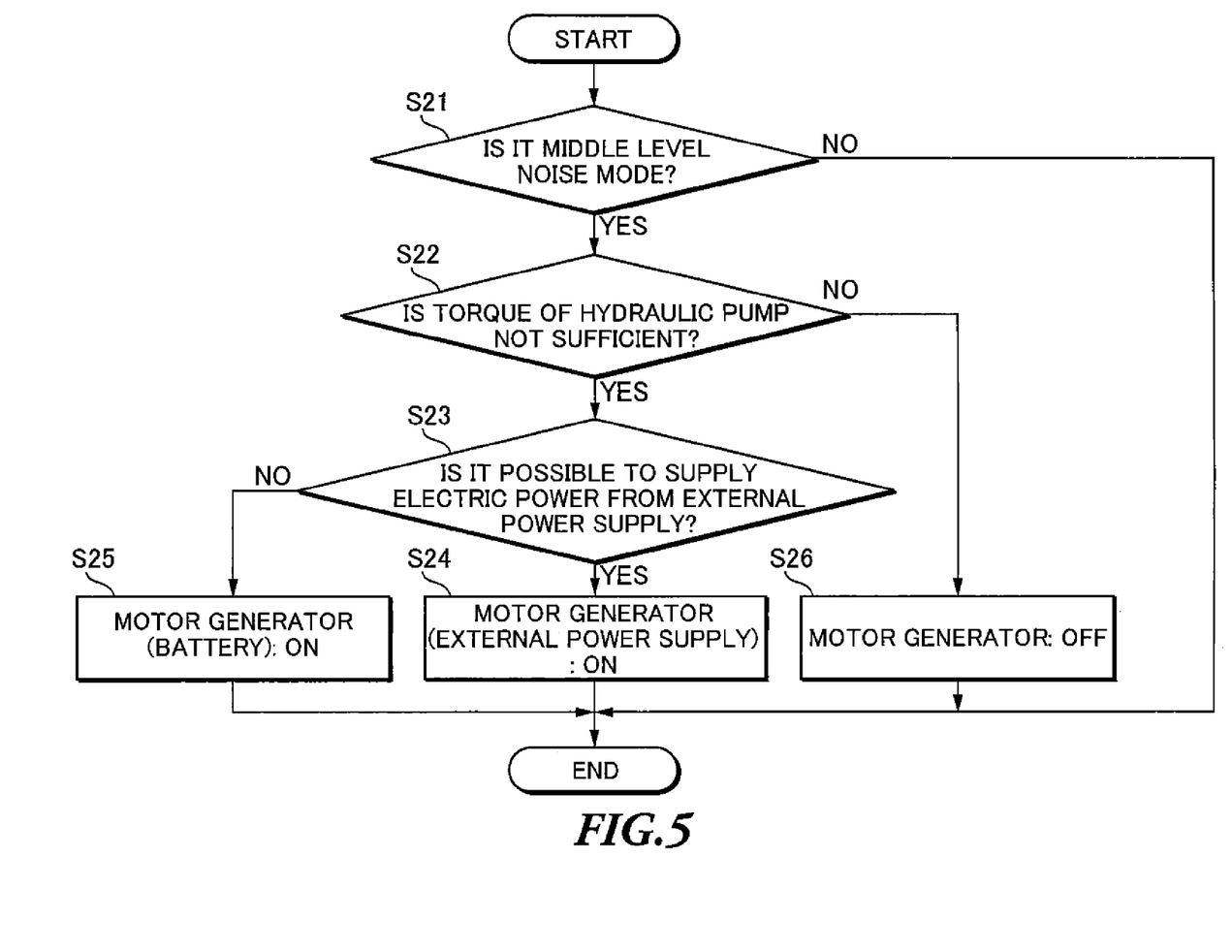
FIG. 5 is a flowchart showing a power control process in a middle level noise mode.

In step S21, the CPU determines whether or not the selected operation mode is the middle level noise mode. When determining that the selected operation mode is the middle level noise mode, the CPU moves the step to step S22. On the other hand, when determining that the selected operation mode is not the middle level noise mode, the CPU ends the power control process.

(Step S22)

Having determined that the selected operation mode is the middle level noise mode in the step S21, the CPU determines whether or not the torque transmitted to the hydraulic pump 31 is not sufficient to perform the crane operation in step S22. When determining that the torque transmitted to the hydraulic pump 31 is not sufficient, the CPU moves the step to step S23. On the other hand, when determining that the torque transmitted to the hydraulic pump 31 is sufficient, the CPU moves the step to step S26. Here, the determination of whether or not the torque transmitted to the hydraulic pump 31 is not sufficient to perform the crane operation is made by acquiring the torque of the hydraulic pump 31 required to perform the crane operation and the torque transmitted from the engine 41*a* to the hydraulic pump 31, and comparing them with one another. The torque of the hydraulic pump 31 required to perform the crane operation is calculated in the same way as in the step S5 regarding the super low noise mode. In addition, the torque transmitted from the engine 41*a* to the hydraulic pump 31 is calculated in the same way as in the step S12 regarding the low noise mode.

(Step S23)

Having determined that the torque transmitted to the hydraulic pump 31 is not sufficient in the step S22, the CPU determines whether or not the electric power of the external power supply can be supplied in the step S23. When determining that the electric power of the external power supply can be supplied, the CPU moves the step to step S24. On the other hand, when determining that the electric power of the external power supply cannot be supplied, the CPU moves the step to step S25.

(Step S24)

Having determined that the electric power of the external power supply can be supplied in the step S23, the CPU drives the motor generator 41*b* by the electric power of the external power supply in the step S24, and ends the power control process.

(Step S25)

Having determined that the electric power of the external power supply cannot be supplied in the step S23, the CPU drives the motor generator 41*b* by the electric power of the battery 41*c* in the step S25, and ends the power control process.

(Step S26)

Having determined that the torque transmitted to the hydraulic pump 31 is sufficient in the step S22, the CPU stops the motor generator 41*b* in step S26, and ends the power control process.

Figure 6:
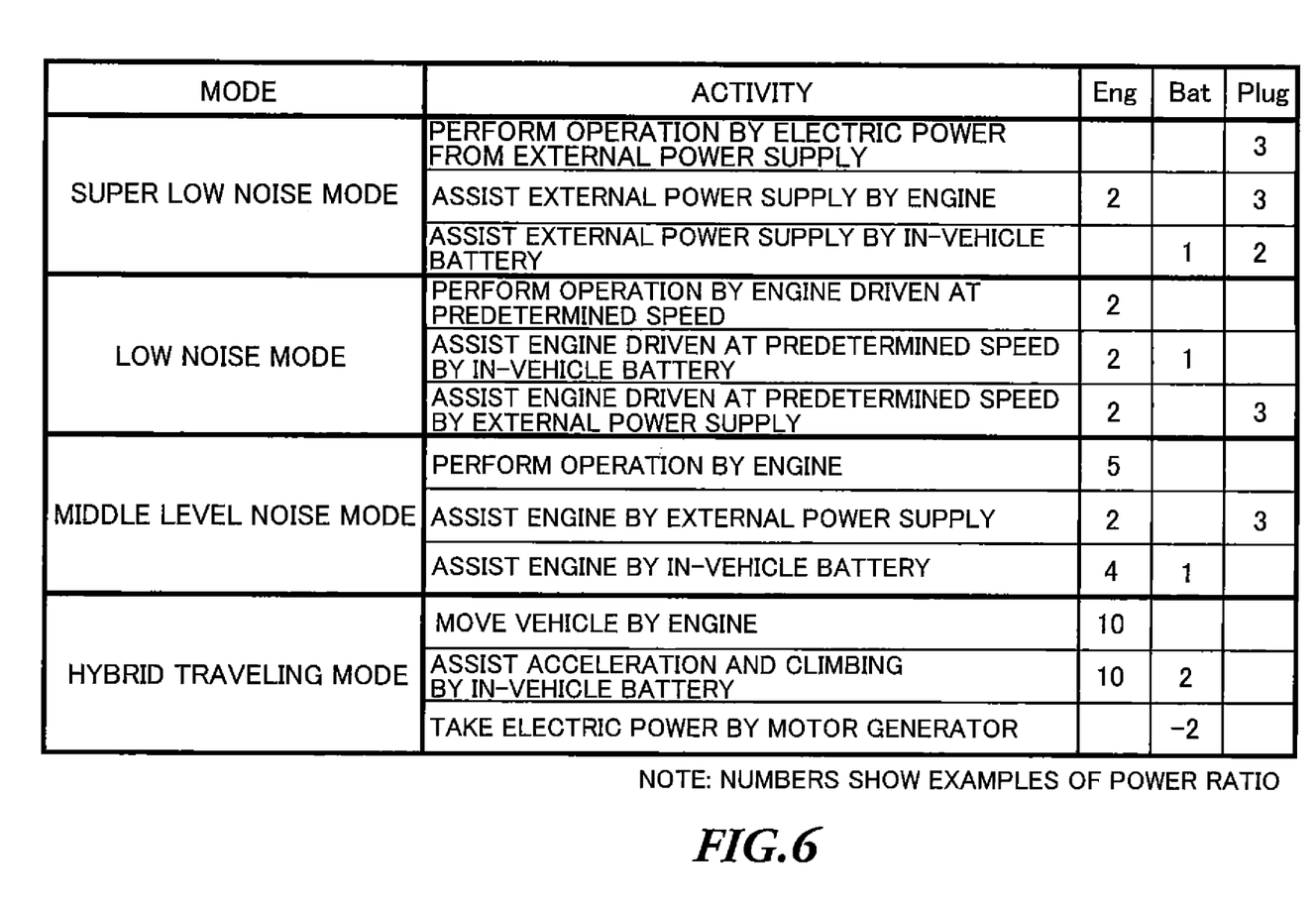
FIG. 6 is a table showing the power ratios of the respective power sources in each of the modes.

FIG. 6 shows the power ratio among the power sources for each of the above-described vehicle moving mode, super low noise mode, low noise mode and middle level noise mode.

In this way, with the working vehicle according to the present embodiment, the hydraulic pump 31 is driven by the power of the motor generator 41*b* that is driven by the electric power supplied from the external power supply via the power cable 41*f*. By this means, when the crane apparatus 20 performs a crane operation in a workplace with an external power supply, it is possible to continuously drive the hydraulic pump 31 by the power of the motor generator 41*b*, and therefore to continuously perform the crane operation by the crane apparatus 20, improving the silence.

In addition, the electric power supplied to the motor generator 41*b* is selectively switched between the electric power of the external power supply and the power of the battery 41*c*. By this means, even if the electric power of the external power supply is not stably supplied, it is possible to continuously perform the crane operation of the crane apparatus 20 by the power of the motor generator 41*b*.

Moreover, the power of the engine 41*a* can be added to the hydraulic pump 31 while the hydraulic pump is driven by the power of the motor generator 41*b*. By this means, when the load acting on the crane apparatus 20 exceeds the maximum output of the motor generator 41*b* while the hydraulic pump 31 is driven by the power of the motor generator 41*b*, it is possible to add the power of the engine 41*a* to the hydraulic pump 31, and therefore to reliably perform the crane operation of the crane apparatus 20. In this case, it is possible to perform the crane operation by adding the power of the engine 41*a* driven at a low speed to the hydraulic pump 31. Therefore, it is possible to maintain the silence and also possible to prevent an increase in the energy consumption.

In addition, the power of the motor generator 41*b* can be added to the hydraulic pump 31 while the hydraulic pump 31 is driven by the power of the engine 41*a* driven at a predetermined speed. By this means, when the load acting on the crane apparatus 20 exceeds the output of the engine 41*a* driven at a predetermined speed while the hydraulic pump 31 is driven by the power of the engine 41*a* driven at the predetermined speed, the power of the motor generator 41*b* can be applied to the hydraulic pump 31. Therefore, it is possible to perform the crane operation of the crane apparatus 20 while maintaining the silent state.

Moreover, in general, the output of the engine 41*a* of the mobile crane 1 is small relative to the weight, and therefore the driving performance such as acceleration is low. However, when the mobile crane 1 is moving, it is possible to transmit the power of the motor generator 41*b* to the propeller shaft 44 as assist power, and also possible to drive the motor generator 41*b* by the propeller shaft 44 to generate electric power. Therefore it is possible to improve the driving performance and also to prevent an increase in the energy consumption.

Moreover, for supplying the power to move the vehicle and to operate the crane, the small motor generator 41*b* is provided, and therefore it is possible to drive an existing engine-driven mobile crane by an electric motor as well as an engine. By this means, it is possible to improve the driving performance and the energy saving performance of the mobile crane 1.

Moreover, in case of an existing mobile crane having an electric motor, it is possible to add the power of the motor generator 41*b* to assist in the supply of the power to move the vehicle while the crane operation is performed. By this means, it is possible to improve the energy saving performance and the silence when the crane operation of the mobile crane is performed.

With the above-described embodiment, the mobile crane 1 has been shown as an exemplary working vehicle, which includes the crane apparatus 20 driven by the hydraulic oil discharged from the hydraulic pump 31. However, it is by no means limiting. The present invention is applicable to, for example, a hydraulic working vehicle such as an aerial work platform and an excavator as long as it is driven by the hydraulic oil discharged from the hydraulic pump.

In addition, with the above-described embodiment, a configuration has been described where the PTO mechanism 46 is provided on the torque converter 42. However, it is by no means limiting. The PTO mechanism 46 may be provided, for example, on the transmission 43 or another gear box as long as it can take the power of the engine 41a and the motor generator 41b. Moreover, as a drive mechanism, a transmission drive mechanism without the torque convertor 42 is applicable.

In addition, with the above-described embodiment, a configuration has been described where, in the middle level noise mode, the hydraulic pump 31 is driven by the power of the engine 41a driven at any speed. However, it is by no means limiting, but another configuration is possible where the maximum output of the engine 41a can be automatically set in the middle level noise mode. For example, a configuration is possible where the output of the engine 41a can be selected from 30%, 40% and 50% of the maximum output in order from the lowest noise, and can be automatically selected based on the positional information from car navigation system and the time, and then the crane operation is performed within the selected output range in the middle noise mode.

Moreover, with the above-described embodiment, a configuration has been described where the crane operation is performed by the power of the motor generator 42b driven mainly by the electric power of the external power supply, and the power of the engine 41a or the electric power of the battery 41c is added to the hydraulic pump 31, and a configuration has been described where the crane operation is performed mainly by the power of engine 41a, and the power of the motor generator 41b is added to the hydraulic pump 31. However, they are by no means limiting. Another embodiment is possible where, for example, the crane operation is performed by the power of the motor generator 41b driven mainly by the electric power of the battery 41c, and the power of the engine 41a or the electric power of the external power supply is added to the hydraulic pump 31.

Moreover, with the above-described embodiment, a configuration has been described where the motor generator 41b is provided, which has the maximum output of about 30% of that of the engine 41a. However, it is by no means limiting. For example, a motor generator having the maximum output of about 50% of that of the engine 41a may be applicable. In this case, it is possible to increase an acceptable load of the crane operation by the power of the motor generator, and therefore to improve the silence during the crane operation. Meanwhile, in addition to the motor generator 41b, for example, an electric motor may be provided, which is driven by an external power supply with the maximum output of 50% of that of the engine 41a. By this means, it is possible to increase an acceptable load of the crane operation by the electric power of the electric motor, and therefore to improve the silence during the crane operation.

Moreover, with the above-described embodiment, a configuration has been described where the motor generator 41b can be driven by the electric power of the battery 41c and the electric power of the external power supply. However, it is by no means limiting. For example, a motor generator driven by the electric power of the battery 41c and an electric motor that can be driven by the electric power of an external power supply may be separately provided.

Moreover, with the above-described embodiment, a configuration has been described where, in the low noise mode, the hydraulic pump 31 is driven by the power of the engine 41a driven at a predetermined speed, which is 20% of the maximum output. However, it is by no means limiting. For example, when the hydraulic pump 31 is driven by the power of the engine driven at a low speed (idling engine speed), which is 10% of the maximum output, the power of the motor generator 41b may be added to the hydraulic pump 31. By this means, it is possible to prevent the engine 41a from suddenly stopping (so-called "stall") because the torque for driving the hydraulic pump 31 is not sufficient.

Moreover, with the above-described embodiment, the output ratios of the engine 41a and the motor generator 41b to the maximum output of the engine 41a have been shown as the concrete figures. However, they are by no means limiting, because the output ratios of the engine 41a and the motor generator 41b vary depending on the type of the working vehicle to which the present invention is applied.

Moreover, with the above-described embodiment, the drive states of the engine 41a and the motor generator 42b have been described in terms of the output ratios to the maximum output of the engine 41a. However, it is by no means limiting. For example, the drive states of the engine 41a and the motor generator 41b may be shown as the ratios to the maximum speed of the engine 41a.

Furthermore, with the above-described embodiment, a configuration has been described where the control while the vehicle is moving and also the control during the crane operation are performed by the controller of the overload protector 50. However, it is by no means limiting. For example, a controller dedicated to the control while the vehicle is moving and a controller dedicated to the control during the crane operation may be individually provided, separately from the overload protector 50.

REFERENCE SIGNS LIST 1 mobile crane, 10 vehicle, 20 crane apparatus, 30 hydraulic supply device, 31 hydraulic pump, 40 power unit, 41 power source unit, 41a engine, 41b motor generator, 41c battery, 41d motor generator drive controller, 41e clutch, 42 torque converter, 43 transmission, 44 propeller shaft, 50 overload protector

The invention claimed is:
1. A working vehicle comprising:
a mobile vehicle body;
a working apparatus provided in the vehicle body and configured to perform a predetermined operation;
an engine configured to be able to output power used to move the mobile vehicle body and to drive the working apparatus;
an electric motor configured to be able to output power used to move the mobile vehicle body and to drive the working apparatus;
a hydraulic pump configured to generate a hydraulic pressure to drive the working apparatus by one of or both the power of the engine and the power of the electric motor;
an external electric power transmission device configured to transfer electric power of an external power supply to the electric motor; and
a hydraulic pump drive unit configured to drive the hydraulic pump by the power of the electric motor that is driven by the electric power transferred from the external electric power transmission device;
a battery configured to be able to supply the electric power to the electric motor; and
a battery power adding device configured to add the electric power of the battery to the electric motor while the hydraulic pump is driven by the hydraulic pump drive unit.

2. The working vehicle according to claim 1, further comprising an engine power adding unit configured to add the power of the engine to the hydraulic pump while the hydraulic pump is being driven by the electric motor.

3. The working machine according to claim 1, further comprising:
- an external electric power supply detection device configured to detect an amount of the electric power supplied from the external power supply; and
- a battery electric power switching device configured to switch supply of the electric power from the battery electric power adding device between the supply of the electric power from the battery to the electric motor and stopping supplying the electric power, based on a result of detection by the external electric power supply detection device.

4. The working machine according to claim 2, further comprising:
- a torque detection device configured to detect a torque transmitted from the electric motor to the hydraulic pump; and
- an engine power addition switching device configured to switch between addition of the power from the engine power adding device to the hydraulic pump and stopping adding the power, based on a result of detection by the torque detection device.

* * * * *